(12) United States Patent
Rutherford et al.

(10) Patent No.: US 8,523,628 B2
(45) Date of Patent: Sep. 3, 2013

(54) NOISE PRODUCING TOY STRUCTURE

(75) Inventors: Ryan Rutherford, Belleville, NJ (US); Jonathan Willinger, Tenafly, NJ (US)

(73) Assignee: J. W. Pet Company, Inc., Chicago, IL (US)

(*) Notice: Subject to any disclaimer, the term of this patent is extended or adjusted under 35 U.S.C. 154(b) by 0 days.

(21) Appl. No.: 13/539,860

(22) Filed: Jul. 2, 2012

(65) Prior Publication Data

US 2012/0270468 A1 Oct. 25, 2012

Related U.S. Application Data

(63) Continuation of application No. 12/540,783, filed on Aug. 13, 2009, now Pat. No. 8,235,762, which is a continuation-in-part of application No. 11/937,631, filed on Nov. 9, 2007, now Pat. No. 7,833,079, and a continuation-in-part of application No. 11/312,244, filed on Dec. 20, 2005, now Pat. No. 7,736,213, and a continuation-in-part of application No. 11/312,071, filed on Dec. 20, 2005, now Pat. No. 7,736,212, said application No. 11/312,244 is a continuation-in-part of application No. 10/889,962, filed on Jul. 13, 2004, now Pat. No. 7,066,779, said application No. 11/312,071 is a continuation-in-part of application No. 10/889,962, filed on Jul. 13, 2004, now Pat. No. 7,066,779.

(60) Provisional application No. 61/183,652, filed on Jun. 3, 2009, provisional application No. 61/100,303, filed on Sep. 26, 2008, provisional application No. 61/088,500, filed on Aug. 13, 2008.

(51) Int. Cl.
*A63H 3/31* (2006.01)
*A01K 29/00* (2006.01)

(52) U.S. Cl.
USPC .......................... 446/184; 119/707; 446/188

(58) Field of Classification Search
USPC ................. 119/707, 709, 711; 446/183, 184, 446/188
See application file for complete search history.

(56) References Cited

U.S. PATENT DOCUMENTS

| 754,148 A | 3/1904 | Kuhlemann |
| 1,187,838 A | 6/1916 | Hughes |

(Continued)

FOREIGN PATENT DOCUMENTS

| CH | 53460 | 2/1912 |
| FR | 625731 | 8/1927 |

(Continued)

OTHER PUBLICATIONS

File History of U.S. Appl. No. 7,736,212.

(Continued)

*Primary Examiner* — John Ricci
(74) *Attorney, Agent, or Firm* — Eckert Seamans Cherin & Mellott, LLC; David V. Radack

(57) ABSTRACT

A noise producing toy structure includes a toy having an outer wall and a crown raised from the outer wall, the outer wall defining an inner space and the crown defining a chamber; an opening for passing ambient fluid into the chamber; and a noise producing element placing the inner space in fluid communication with chamber. The crown hinders access to the noise producing element to resist unintended removal of the noise producing element. A noise producing toy structure includes a toy having an outer wall, a noise producing element disposed in the outer wall for placing the inner space in fluid communication with an environment; and a wall upright from the outer wall at a position proximal to the noise producing element. The wall has a free end to space a user from the noise producing element to hinder access to the noise producing element.

21 Claims, 18 Drawing Sheets

(56) References Cited

U.S. PATENT DOCUMENTS

| | | |
|---|---|---|
| 1,612,651 A | 12/1926 | Roberts |
| 1,668,785 A | 5/1928 | Smart |
| 2,365,807 A | 12/1944 | Dialynas |
| 2,532,742 A | 12/1950 | Stoiner |
| 2,631,407 A | 3/1953 | Rempel |
| 2,712,201 A | 7/1955 | Wintriss |
| 2,714,275 A | 8/1955 | Proll |
| 2,721,420 A | 10/1955 | Chatten |
| 2,734,309 A | 2/1956 | Seaver |
| 2,745,214 A | 5/1956 | Lawson |
| 2,763,960 A | 9/1956 | Wintriss |
| 2,777,252 A | 1/1957 | Tancredi et al. |
| 2,817,116 A | 12/1957 | Miller et al. |
| 2,975,550 A | 3/1961 | Miller |
| 3,075,317 A | 1/1963 | Craft |
| 3,340,846 A | 9/1967 | Magiera |
| 3,702,038 A | 11/1972 | Hakim |
| 3,878,641 A | 4/1975 | Noble |
| 3,956,850 A | 5/1976 | Seidenberg |
| RE29,050 E | 11/1976 | Hakim |
| 4,012,854 A | 3/1977 | Berend et al. |
| 4,253,254 A | 3/1981 | Gill |
| 4,380,134 A | 4/1983 | Taluba et al. |
| 4,506,468 A | 3/1985 | Willhite |
| 4,779,344 A | 10/1988 | Panisch |
| 4,787,100 A | 11/1988 | Jonat |
| 5,036,604 A | 8/1991 | Rosen |
| 5,113,784 A | 5/1992 | Forselius |
| 5,224,278 A | 7/1993 | Jeon |
| 5,267,885 A | 12/1993 | Niskern et al. |
| 5,421,107 A | 6/1995 | Bryan |
| 6,112,703 A | 9/2000 | Handelsman |
| 6,216,640 B1 | 4/2001 | Zelinger |
| 6,413,139 B1 | 7/2002 | Douglas |
| 6,609,944 B1 | 8/2003 | Viola |
| 6,881,120 B1 | 4/2005 | Janes |
| 6,935,274 B1 | 8/2005 | Rothschild |
| 7,066,779 B2 | 6/2006 | Willinger |
| 7,201,117 B2 | 4/2007 | Ritchey et al. |
| 7,343,878 B2 | 3/2008 | Ritchey et al. |
| 7,736,212 B2 | 6/2010 | Willinger |
| 7,736,213 B2 | 6/2010 | Willinger et al. |
| 7,833,079 B2 | 11/2010 | Willinger et al. |
| 2001/0008125 A1 | 7/2001 | Mann |
| 2002/0102912 A1 | 8/2002 | Duval |
| 2007/0245976 A1 | 10/2007 | Ritchey et al. |

FOREIGN PATENT DOCUMENTS

| | | |
|---|---|---|
| GB | 2 191 383 | 12/1987 |
| GB | 2 195 522 | 4/1988 |

OTHER PUBLICATIONS

File History of U.S. Appl. No. 7,736,213.
File History of U.S. Appl. No. 7,833,079.
Bowzer Ball images taken on May 13, 2008, Copyright Statement on Label indicating Copyright Date of 2006.
United States Office Action dated Jul. 20, 2009, from corresponding U.S. Appl. No. 11/937,631, now U.S. Patent 7,833,079.
United States Office Action dated Dec. 31, 2007, from corresponding U.S. Appl. No. 11/312,244, now U.S. Patent 7,736,213.
United States Office Action dated Sep. 8, 2008, from corresponding U.S. Appl. No. 11/312,244, now U.S. Patent 7,736,213.
United States Office Action dated May 27, 2009, from corresponding U.S. Appl. No. 11/312,244, now U.S. Patent 7,736,213.
United States Office Action dated Aug. 12, 2009, from corresponding U.S. Appl. No. 11/312,244, now U.S. Patent 7,736,213.
United States Office Action dated Dec. 31, 2007, from corresponding U.S. Appl. No. 11/312,071, now U.S. Patent 7,736,212.
United States Office Action dated Sep. 2, 2009, from corresponding U.S. Appl. No. 11/312,071, now U.S. Patent 7,736,212.
United States Office Action dated Dec. 13, 2004, from corresponding U.S. Appl. No. 10/889,962.
United States Office Action dated Sep. 9, 2008, from corresponding U.S. Appl. No. 11/312,071, now U.S. Patent 7,736,212.
United States Office Action dated Dec. 30, 2008, from corresponding U.S. Appl. No. 11/312,071, now U.S. Patent 7,736,212.
United States Office Action dated Feb. 18, 2009, from corresponding U.S. Appl. No. 11/312,244, now U.S. Patent 7,736,213.
United States Office Action dated Nov. 17, 2011, from corresponding U.S. Appl. No. 12/540,783.

NOISE PRODUCING TOY STRUCTURE

CROSS-REFERENCE TO RELATED APPLICATIONS

This application is a continuation of and claims priority to U.S. Ser. No. 12/540,783 filed on Aug. 13, 2009, which is pending and which is herein incorporated by reference in its entirety for all purposes.

U.S. Ser. No. 12/540,783 is a non-provisional counterpart to and claims priority to U.S. Ser. No. 61/183,652 filed Jun. 3, 2009, which was pending at the time U.S. Ser. No. 12/540,783 was filed and which is herein incorporated by reference in its entirety for all purposes.

U.S. Ser. No. 12/540,783 is a non-provisional counterpart to and claims priority to U.S. Ser. No. 61/100,303 filed Sep. 26, 2008, which was pending at the time U.S. Ser. No. 12/540,783 was filed and which is herein incorporated by reference in its entirety for all purposes.

U.S. Ser. No. 12/540,783 is a non-provisional counterpart to and claims priority to U.S. Ser. No. 61/088,500 filed Aug. 13, 2008, which was pending at the time U.S. Ser. No. 12/540,783 was filed and which is herein incorporated by reference in its entirety for all purposes.

U.S. Ser. No. 12/540,783 is a continuation-in-part application and claims priority to U.S. Ser. No. 11/937,631, now U.S. Pat. No. 7,833,079, filed Nov. 9, 2007, which was pending at the time U.S. Ser. No. 12/540,783 was filed and which is herein incorporated by reference in its entirety for all purposes.

U.S. Ser. No. 12/540,783 is a continuation-in-part application and claims priority to U.S. Ser. No. 11/312,244, now U.S. Pat. No. 7,736,213, filed Dec. 20, 2005, which was pending at the time U.S. Ser. No. 12/540,783 was filed and which is herein incorporated by reference in its entirety for all purposes.

U.S. Ser. No. 12/540,783 is a continuation-in-part application and claims priority to U.S. Ser. No. 11/312,071, now U.S. Pat. No. 7,736,212, filed Dec. 20, 2005, which was pending at the time U.S. Ser. No. 12/540,783 was filed and which is herein incorporated by reference in its entirety for all purposes.

U.S. Ser. No. 11/312,244, now U.S. Pat. No. 7,736,213, and U.S. Ser. No. 11/312,071, now U.S. Pat. No. 7,736,212, are continuation-in-part applications of and claim priority to U.S. Ser. No. 10/889,962, now U.S. Pat. No. 7,066,779, filed on Jul. 13, 2004, which was pending at the time U.S. Ser. Nos. 11/312,244 and 11/312,071 were filed and which is herein incorporated by reference in its entirety for all purposes.

BACKGROUND OF THE INVENTION

1. Field of Invention

The present invention relates generally to the field of toys. More specifically, the present invention is related to a noise producing toy structure wherein fluid movement causes a noise.

2. Discussion of Prior Art

Generally, inserting a noise producing element into a Figure or ball toy is well known. U.S. Pat. No. 754,148, U.S. Pat. No. 1,187,838, U.S. Pat. No. 1,668,785, U.S. Pat. No. RE29050, U.S. Pat. No. 3,075,317 and U.S. Pat. No. 3,702,038 show such devices. These patents are hereby incorporated by reference in their entirety.

As far as mounting arrangements go, in the case of vinyl material, as shown in FIG. 1a and FIG. 1b, the mounting of the squeaker mechanism into a toy is commonly done by molding an opening into the material. A common fitting is inserted into this opening. When bonded this fitting creates a slight whistling sound which could stand alone as a noise element. A barbed squeaker can then be forced into the fitting for a true squeak sound. And for latex material, as shown in FIG. 1c, a ribbed mound of material is created with a rough through-hole into which a barbed squeaker is inserted.

The prior art fails to provide squeakers utilizing a separate holder for gluing to a rubber toy. Also, none of the prior art squeakers have the present invention method for complying with child safety standards.

Whatever the precise merits, features, and advantages of the above cited references, none of them achieves or fulfills the purposes of the present invention.

SUMMARY OF THE INVENTION

The present invention includes a mounting arrangement for a squeaker into a rubber ball toy. The squeaker mechanism is trapped within a polystyrene or rubber sleeve to form a noise producing element. The sleeve has a recessed area that tightly mates with an opening in the rubber toy and also includes a bonding surface to secure the sleeve to the toy.

In an alternative embodiment, the sleeve also has fin members that extend orthogonally from a distal end of the sleeve. The total width of the sleeve and the associated fin members is such that it complies with consumer product safety requirements. The fin members make the sleeve substantially larger than the opening in the toy such that it is inherent in the structure that the sleeve and squeaker will fall into the toy if the bond holding the sleeve to the toy happens to fail.

In yet another alternative embodiment, a shroud for enclosing a squeaker has a generally cylindrical but tapered shape and includes two flanges (e.g., an interior flange and an exterior flange) at a proximate end of the shroud. A bonding surface between the two flanges is adapted to fit into an opening in a hollow toy. The interior flange has a diameter that is larger than both the exterior flange and the diameter of the opening in the toy. The structure is thus adapted to retain the shroud enclosing the squeaker within the hollow toy even if the shroud becomes loose from the opening in the toy.

A noise producing toy structure includes a toy having an outer wall, which defines an inner space. A sealed cavity and a chamber are disposed in the inner space. An opening in the outer wall passes ambient fluid into the chamber and a noise producing element places the cavity in fluid communication with the chamber. Other noise producing toy structures are also disclosed.

BRIEF DESCRIPTION OF THE DRAWINGS

FIG. 6b illustrates an open isometric view of the shroud containing a squeaker mechanism of FIG. 6a;

FIG. 6c illustrates an exploded isometric view of the shroud containing a squeaker mechanism of FIG. 6a;

FIG. 6d illustrates a close-up open isometric view of the shroud containing a squeaker mechanism of FIG. 6a;

FIG. 7a illustrates a front plan view of one half of the sleeve of FIG. 6a;

FIG. 7b illustrates a side plan view of one half of the sleeve of FIG. 6a; and

FIG. 7c illustrates a top plan view of one half of the sleeve of FIG. 6a.

DESCRIPTION OF THE PREFERRED EMBODIMENTS

Figure 1A:
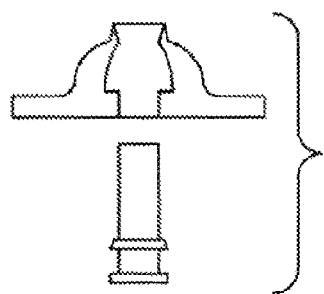
FIG. 1a illustrates a prior art common fitting inserted into an opening molded into the vinyl.
Figure 1B:
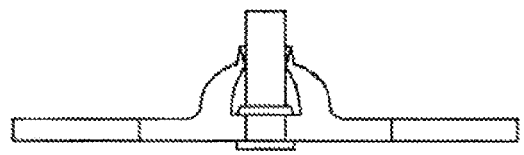
FIG. 1b illustrates a prior art method of inserting squeaker into a common fitting.
Figure 1C:
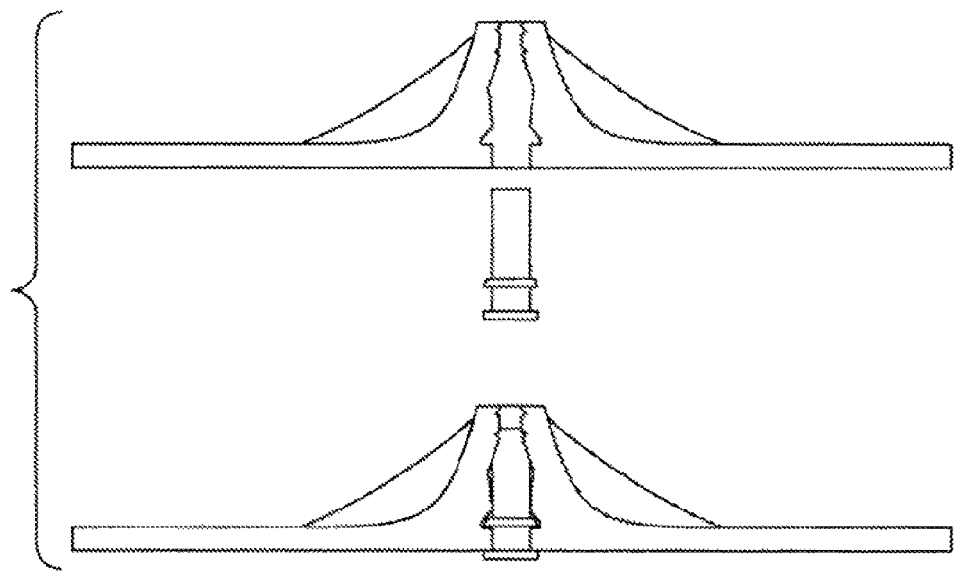
FIG. 1c illustrates a prior art method of inserting squeaker into a rough through-hole.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2A:
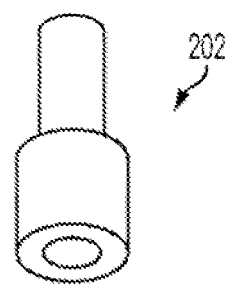
FIG. 2a illustrates a typical squeaker mechanism.
Figure 2B:
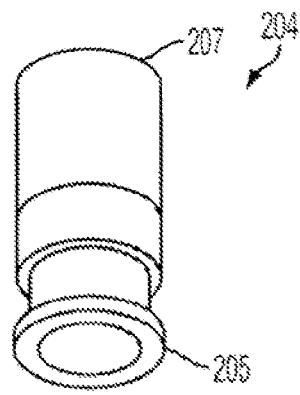
FIG. 2b illustrates a rubber sleeve to hold squeaker mechanism.
Figure 2C:
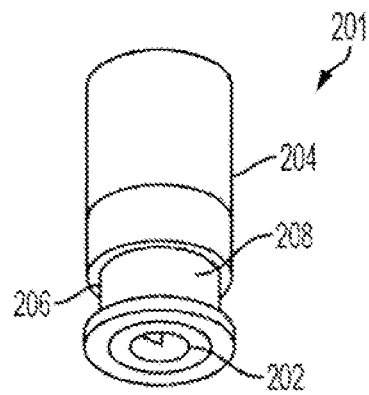
FIG. 2c illustrates squeaker mechanism retained in a sleeve and the rubber sleeve including a gluing surface.

FIG. 2a shows a typical squeaker mechanism 202. According to a preferred embodiment, FIG. 2b shows rubber sleeve 204 with proximate and distal ends 205, 207 respectively. Noise producing element 201 as shown in FIG. 2c, is formed by engaging squeaker 202 with sleeve 204 such that squeaker 202 is retained within sleeve 204. The squeaker made from oliphanic material such as polypropylene or polyethylene, is placed into a sleeve that is styrenic and therefore provides a better bonding surface than the squeaker by itself.

Figure 3:
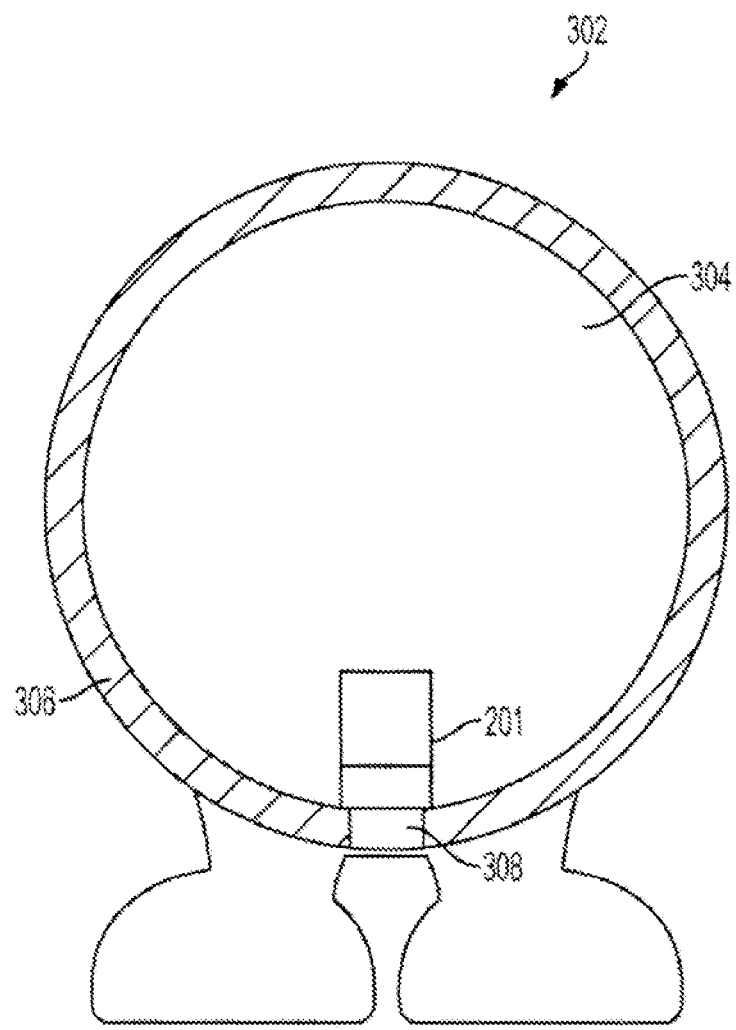
FIG. 3 illustrates mounting arrangement of squeaker in rubber ball.

Referring now to FIG. 3, rubber toy 302 is fashioned of thick-walled heavy-duty rubber. The toy is formed with a hollow body 304 and an outer shell 306. The outer shell is, for example, 2" in diameter. The toy comprises an opening 308 through which the squeaker trapped in a rubber sleeve is inserted. Going back to FIG. 2c, the rubber sleeve is utilized as a separate holder for the squeaker and is provided with a bonding surface 208 that aids in the securing of the sleeve to the toy. The sleeve has recessed area 206 that tightly mates with opening 308 in the rubber toy and is bonded to the toy with cyanoacrylate. Please note that functionally equivalent squeaker materials, sleeve materials and bonding agents may be used without departing from the scope of the present invention.

Figure 4A:
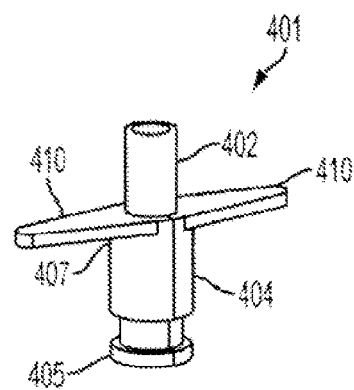
FIG. 4a illustrates a squeaker mechanism retained in a polystyrene sleeve.
Figure 4B:
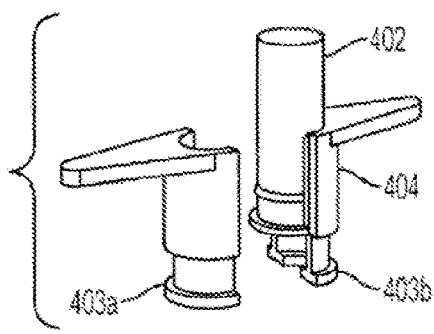
FIG. 4b illustrates a sleeve composed of two half shells and extending fins.
Figure 4C:
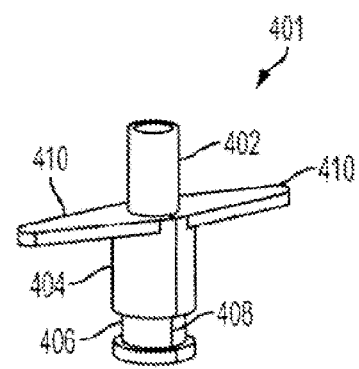
FIG. 4c illustrates a sleeve including a gluing surface.

FIGS. 4a, 4b, 4c illustrate a second embodiment of the present invention. FIG. 4a shows squeaker 402 retained in polystyrene sleeve 404, with proximate and distal ends 405, 407 respectively, forming noise producing element 401. Sleeve 404 as shown in FIG. 4b is composed of two half shells 403a, 403b to be secured together.

In order to pass the Consumer Product Safety Commission standard for small children, the sleeve size of the present invention must not fall into a 1¼ inch aperture. Therefore to meet the safety ratings, preferably by a ½" diameter, sleeve 404 also includes integral extended members or fins 410 which are orthogonal to squeaker 402 to expand the total width of the sleeve. Please note that fins 410, in an alternative embodiment, may follow the curvature of the inner surface of the small toy.

Figure 5:
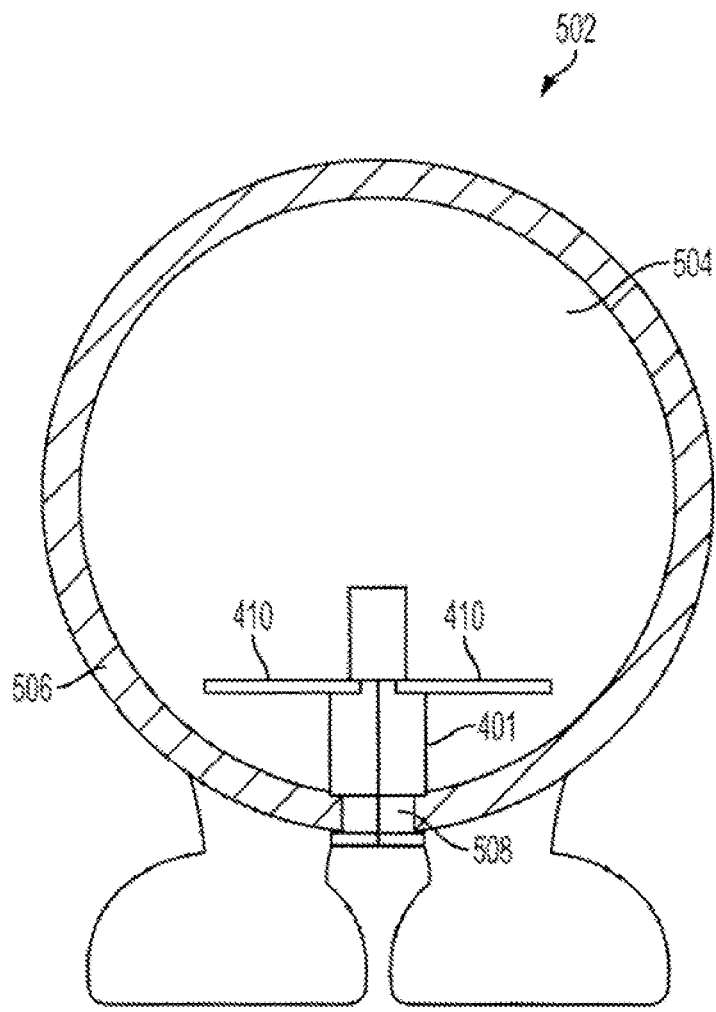
FIG. 5 illustrates mounting arrangement of squeaker in a rubber ball.

Referring to FIG. 5, rubber toy 502 is similar in structure to rubber toy 302 of FIG. 3. The toy is formed with a hollow body 504 and outer shell 506. The outer shell is, for example, 3" in diameter. Sleeve 404 acts as a better bonding surface than squeaker 402. As shown in FIG. 4c, recessed area 406 integral to the sleeve mates with an opening 508 in the rubber toy 302. Sleeve 404 including bonding surface 408 secures the sleeve to the rubber toy with cyanoacrylate. Please note that a bigger sized squeaker (with sleeve) could be mounted into a correspondingly bigger toy in a similar manner so as to still provide for the requirements of consumer product safety rating as described above.

As shown in FIG. 5, note that the total width of the sleeve 404 (including the fins 410) is substantially larger than the opening 508 in the rubber toy 302. Thus, it is inherent in the above described structure that even if the cyanoacrylate (or other bonding agent) holding the sleeve 404 to the rubber toy 302 should happen to fail, the sleeve 404 and the squeaker 402 would be retained within the rubber toy 302. That is to say, the sleeve structure that includes the integral fins 410 disclosed in FIG. 5 is inherently adapted to cause the sleeve 404 and the squeaker 402 to fall into the rubber toy 302 (as opposed to falling out of the rubber toy 302) if the bond between the bonding surface 408 of the sleeve 404 separates from the opening 508 in the rubber toy 302.

Figure 6A:
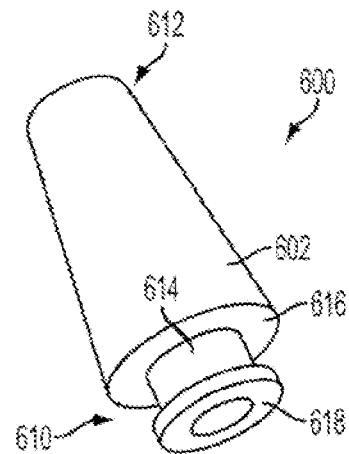
FIG. 6a illustrates an isometric view of an additional embodiment of a shroud for protecting a squeaker mechanism.
Figure 6B:
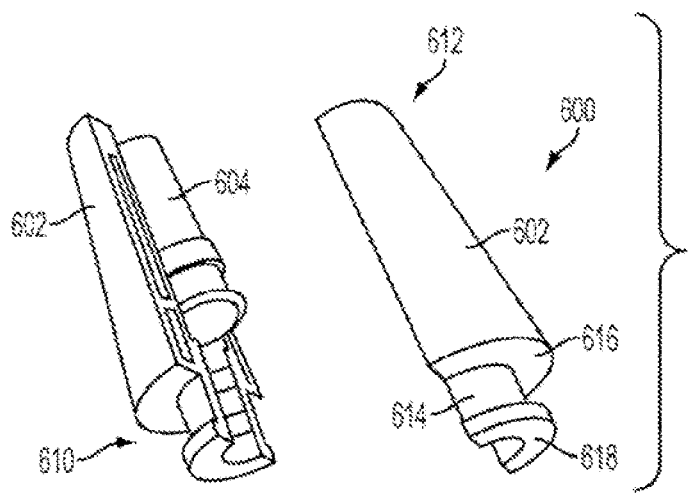
Figure 6C:
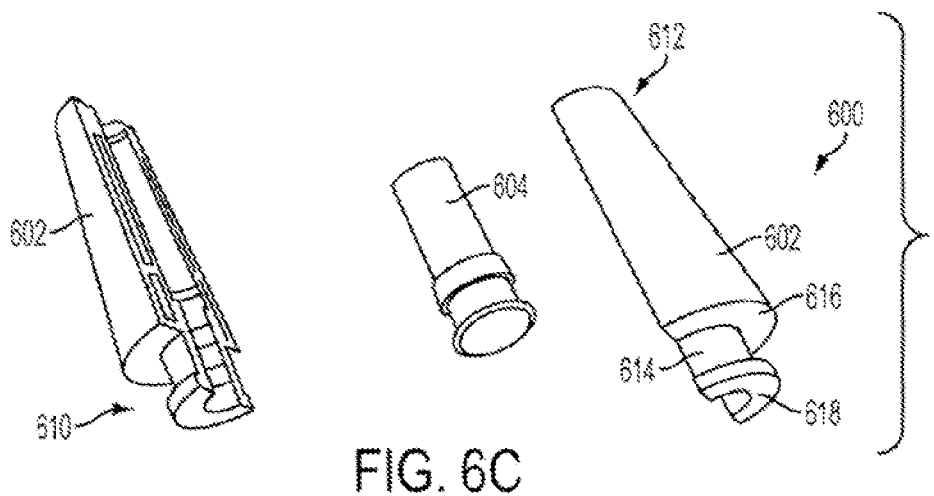
Figure 6D:
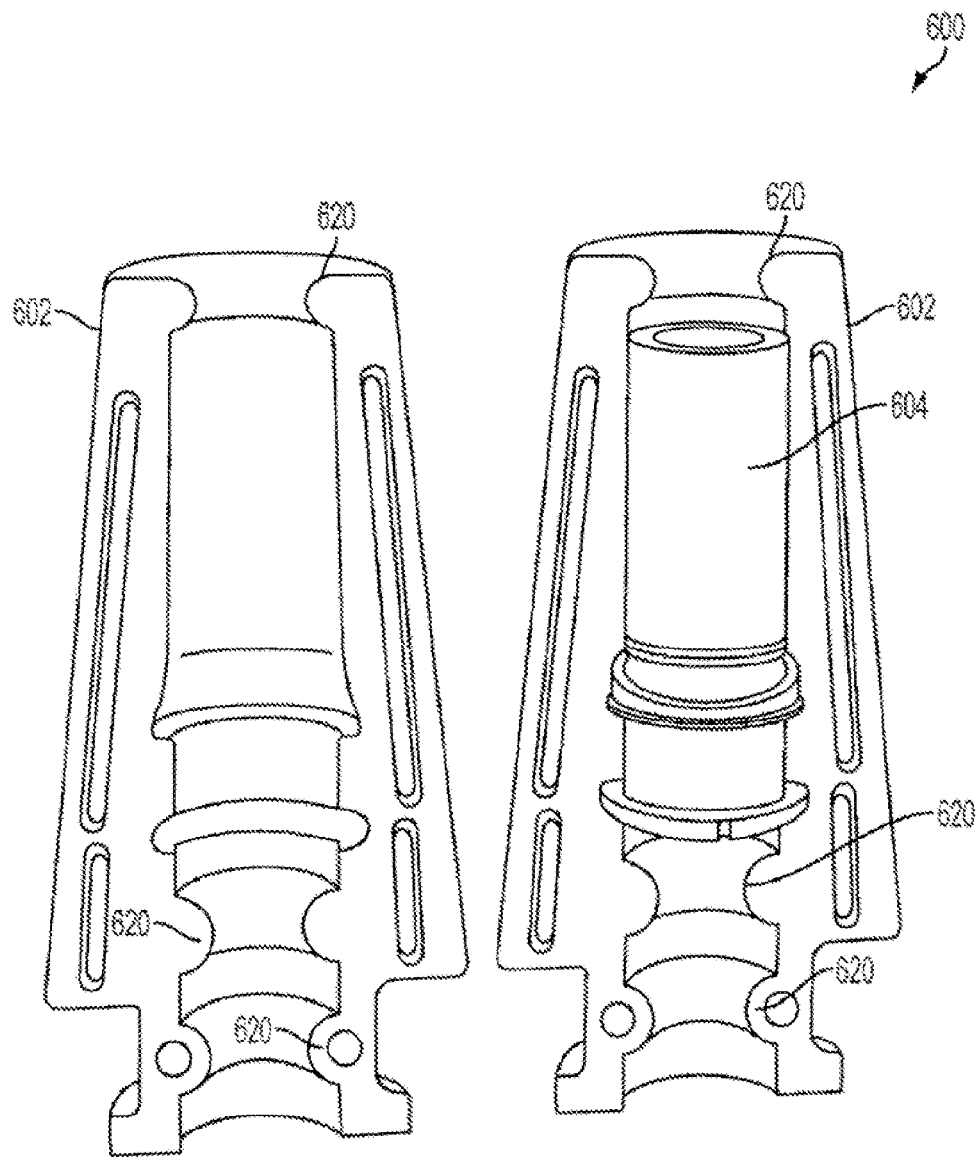
Figure 7A:
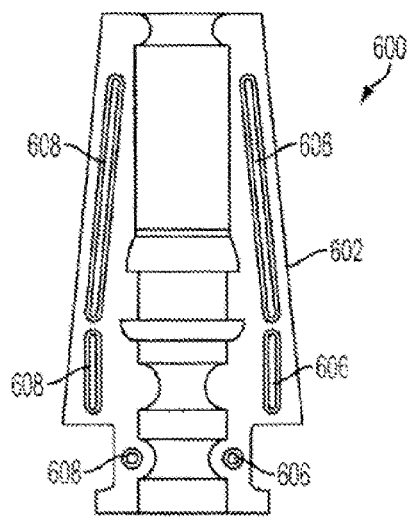
Figure 7B:
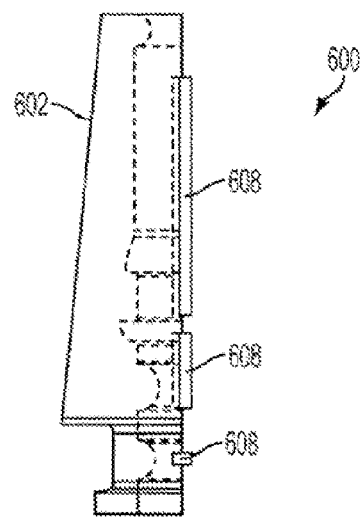
Figure 7C:

Turning now to FIGS. 6a through 6d and FIGS. 7a through 7c, an additional embodiment of the present invention is illustrated. FIG. 6a depicts an isometric view of a novel shroud for containing and protecting a squeaker mechanism for use in, e.g., a hollow toy such as a rubber ball or other play device. FIGS. 6b through 6c depict open, exploded, and close-up open isometric views, respectively, of the shroud containing the squeaker mechanism. FIGS. 7a through 7c depict front, side, and top plan views of the shroud of FIG. 6a.

The embodiment of the present invention that may generally referred to as a noise producing assembly 600 is depicted in FIGS. 6a-6d and 7a-7c and may be particularly well adapted to prevent an animal (e.g., a large dog with powerful jaws) from damaging the squeaker mechanism or from biting/chewing out the squeaker mechanism. The depicted noise producing assembly 600 includes a shroud 602 that completely encases a squeaker mechanism 604. The shroud 602 and squeaker mechanism 604 may be made from any practicable material including various plastics, styrenic materials, and those materials described above with respect to the sleeves 204, 404 and squeaker mechanisms 202, 402 of other embodiments. The shroud 602 may be assembled from two identical pieces that may be joined together around the squeaker mechanism 604 as illustrated. In some embodiments, the shroud halves may include cavities 606 that are adapted to receive bosses 608 that serve to align the halves and strengthen the joint. These features may be most clearly seen in FIGS. 7a through 7c. Note that by having bosses 608 on one side of the shroud half and receiving cavities 606 on the other side of the same shroud half, the same part may be used to manufacture both halves of the shroud 602. The two shroud halves may be joined together using any practicable chemical and/or mechanical bonding method such as methyl ethyl ketone (MEK), cyanoacrylate, other bonding agent, locking pins, snap fasteners, clips, etc., to both lock the squeaker mechanism 604 in place and to protect the squeaker mechanism 604.

Referring to FIG. 6a, the shroud 602 and squeaker mechanism 604 may be generally cylindrical. In some embodiments, the shape of the shroud 602 may taper from a wider diameter to a narrower diameter as the shroud 602 extends from a proximate end 610 to a distal end 612. The tapered shape may aid in inserting the noise producing assembly 600 into an opening in a toy (not shown). The proximate end 610 may also include a bonding surface 614 that is adapted to be bonded to the inside of the opening in a toy using any practicable chemical and/or mechanical bonding method such as methyl ethyl ketone (MEK), cyanoacrylate, other bonding agent, locking pins, snap fasteners, clips, etc. The diameter of the shroud 602 at the bonding surface 614 may be sized to precisely fit the opening in the toy.

The shroud 602 may also include an interior flange 616 and an exterior flange 618 at the proximate end 610 that together are adapted to hold the noise producing assembly 600 in the opening of the toy, thereby supporting the bonding method. In some embodiments, the toy may include a countersunk opening (not shown) that is adapted to receive the exterior flange 618 so that the exterior flange 618 sits flush with the outer surface of the toy. The interior flange 616 may have a diameter the size of the widest part of the shroud 602 and be substantially larger than both the exterior flange 618 and the opening in the toy. For example, the diameter of the interior flange 616 may be approximately 1.3 to 5 times larger than the opening in the toy. Other dimensions are possible. The diameter of the exterior flange 618 may be larger than the opening in the toy but smaller than the interior flange 616. This structure insures that even if the bonding method fails, the noise producing assembly 600 can only fall into the toy and cannot exit the toy. Further, even if the opening in the toy is distorted and/or enlarged enough to let the flanges slip through, the noise producing assembly 600 will tend to be more likely to fall into the toy than out of the toy due to the relative sizes of the flanges. Thus, the structure provides an inherent safety feature to the present invention that is operative to prevent an animal from working the noise producing assembly 600 out of the toy through chewing, biting, or otherwise distorting the toy. This safety feature can help prevent choking or other injuries to an animal playing with the toy, because even if the noise producing assembly 600 does become loose, it will remain trapped within the toy.

As indicated above, the squeaker mechanism 604 may be completely contained in the shroud 602. Completely encapsulating the squeaker mechanism 604 in the shroud 602 provides additionally safety features to the present invention. The entire length of the squeaker mechanism 604 may be bonded to the shroud 602 to further prevent removal of the squeaker mechanism 604 from the toy. Referring specifically to FIG. 6d, the shroud 602 may also include internal rings 620 that both add structural stability to the noise producing assembly 600 and further secure the squeaker mechanism 604 in the shroud 602 by preventing longitudinal movement of the squeaker mechanism 604 relative to the shroud 602. Each of the internal rings 620 include an opening that is smaller in diameter than the diameter of the squeaker mechanism 604 at the ends of the squeaker mechanism 604. The body of the squeaker mechanism 604 may further include annular protrusions and recesses that mate with corresponding recesses and protrusions in the inner surface of the shroud 602 that also prevent longitudinal movement of the squeaker mechanism 604 relative to the shroud 602. The added structural stability of the internal rings 620 insures that the noise producing assembly 600 cannot be crushed by an animal playing with the toy or by chewing, biting, or otherwise distorting the toy.

FIGS. 8a-8g are cross-sectional schematic views of respective noise producing toy structures in accordance with one or more embodiments of the present invention. Although the figures illustrate a body having a substantially circular outer wall in cross-section, the present invention is not limited to a toy or toy structure that is circular in cross-section. The cross-sectional shapes herein are illustrative only, and, thus, square, octagonal, irregular, rectangular, and/or any other shape that may be suitable are contemplated for use.

The body comprises natural rubber, synthetic rubber, thermoplastic elastomers, vinyl, and/or like elastic and/or resilient material and preferably when thrown provides a bounce to enhance the use of the toy or when used is resiliently elastic to permit the partial or complete evacuation of fluid media from one or more cavities or spaces. As used herein "used" refers to the toy being thrown, squeezed, impacted, manipulated or otherwise temporarily deformed sufficient to permit the partial or complete evacuation of fluid media, such as air, from one or more cavities or spaces.

The cavities described herein need not extend along the entire length of the body but may be formed with end walls and thus comprise structures upright from another wall.

As taught herein, the mounting of a squeaker is different in vinyl or in natural rubber or synthetic rubber. Herein, natural or synthetic rubber is preferred as a body for the toy.

A noise producing toy structure 700a-700g for a toy for a pet or human comprises a respective toy 702a-702g and a noise producing assembly or noise producing element 704, hereinafter referred to as a squeaker 704 for simplicity. Squeaker 704 may be any of the squeakers taught previously and especially noise producing assembly 600 having a shroud 602 that completely encases a squeaker mechanism, and which is mounted in the toy.

Respective toy 702a-702g includes a respective body 706a-706g comprising one or more sealed cavities 730a-730g in fluid communication via the squeaker with a dampening cavity or structure 740a-740g.

The dampening chamber limits the quantity of air movement through the squeaker to prolong the noise produced by the squeaker. The dampening chamber also recesses the squeaker from a user accessible area of the toy reducing the potential of a user, such as a pet or a child, removing and/or ingesting the squeaker.

Figure 8A:
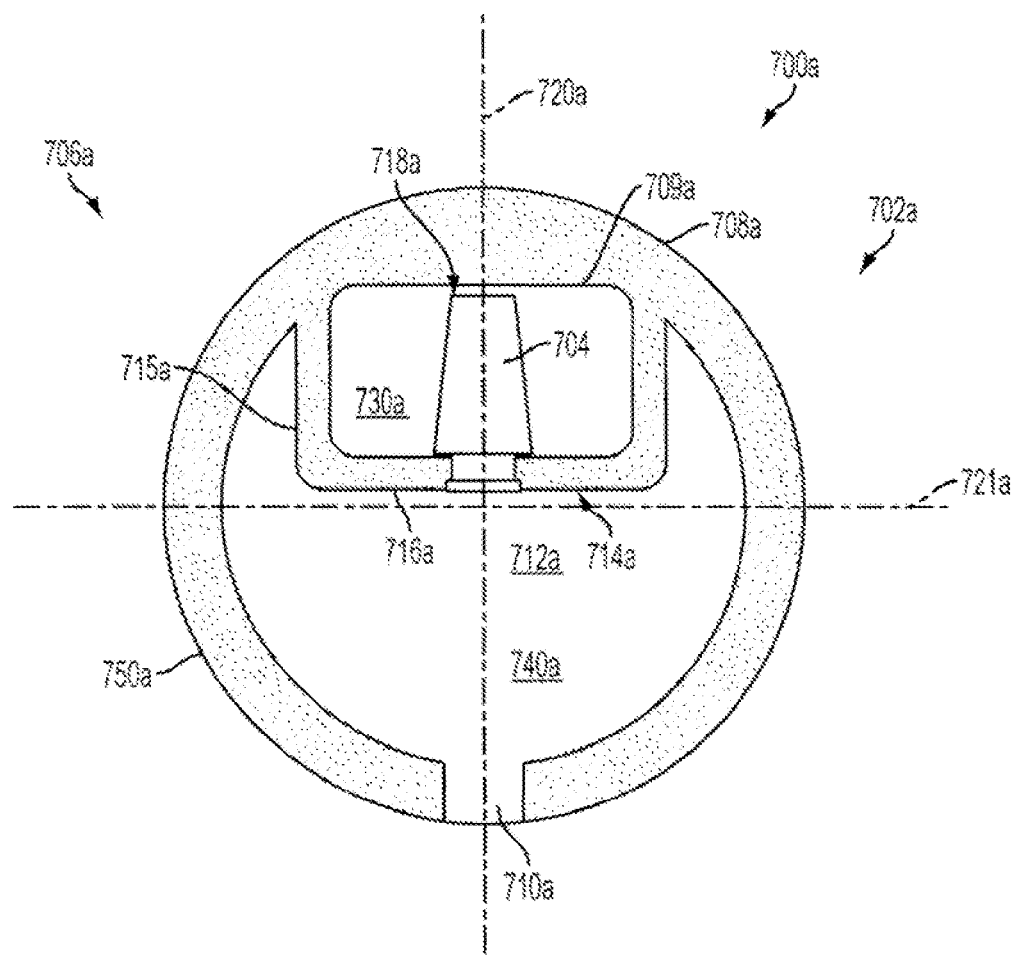
FIGS. 8a-8g are cross-sectional schematic view of respective noise producing toy structures in accordance with one or more embodiments of the present invention.

In accordance with one or more embodiments of the present invention, FIG. 8a is a cross-sectional schematic view of a noise producing toy structure. A noise producing toy structure 700a includes a toy 702a and squeaker 704. The toy comprises a substantially hollow body 706a having any suitable shape that includes the present noise producing toy structure.

An outer wall 708a of the body comprises a thick-wall construction and defines an inner space 712a. The outer wall includes at least one opening 710a for passage of the fluid. The opening may comprise a thickened peripheral portion for reinforcement and may have any suitable dimension. However, the size of the opening is preferably limited so that fluid movement is slowed to prolong the noise production of the squeaker.

An inner wall structure 714a comprises a thin-wall construction, i.e., is thinner than the outer wall, and divides the inner space into a sealed cavity 730a and a dampening chamber 740a, wherein the dampening chamber is much larger than the sealed cavity for limiting the sound level, i.e., volume, of noise. An outer wall portion 709a of the toy comprises a thickened wall and spans from one side wall to the other side wall.

The inner wall structure is limited in size to resist unintended removal by placing it in a portion distal from the opening. The inner wall structure includes one or more side walls 715a and a transverse wall 716a forming a cavity that has a depth approximately the same as the squeaker. A gap 718a is provided between the distal end of the squeaker and an outer wall portion 709a of the toy, which has been provided with a thickening.

Squeaker 704 is disposed in the transverse wall to project into cavity 730a and is connected in any of the manners taught above. The squeaker places cavity 730a in fluid communication with chamber 740a. Preferably, a longitudinal axis 720a of the squeaker 704 connecting the proximal and distal ends of the squeaker also passes substantially through opening 710a.

With respect to the inner wall structure, the side walls are preferably angled with respect to a line tangent to the outer wall and protrude into the inner space to form a rectangular shape with the transverse wall in a cross-sectional view. Preferably, the side walls are spaced-apart from the outer wall at the intersection of the transverse wall and the side wall to limit deformation of the cavity 730a. Additionally, the inner wall structure is sized to resist deformation of the cavity 730a and permit it only when wall portion 709a is deformed. Therein, side walls 715a are sized to locate the transverse wall and cavity in an upper portion for the body.

Thus, for example, if plane 721a denotes a longitudinal plane bisecting the body, the cavity and squeaker are located in the portion distal from the opening to advantageously provide a large dampening chamber 740a and/or recess the squeaker from a user accessible portion 750a comprising the outer surface of outer wall 708a.

Therefore, when the toy is used, a deformation in the outer wall 708a except in portion 709a will decrease the fluid volume in chamber 740a. Some of the fluid will be forced through the fluid passage of the squeaker into cavity 730a. In the process, the squeaker produces a noise.

As the body resiliently returns to its original shape, chamber 740a expands slowly as the opening 710a throttles the quantity of fluid returning into the cavity. As fluid pressure equalizes between cavity 730a and chamber 740a, fluid moves from cavity 730a into chamber 740a causing a noise.

Preferably, gap 718a may comprise a dimension of 1-5 mm and to further limit the flow of the fluid into and from the cavity 730a and prolonging the noise.

In one or more embodiments, opening 710a is suitably sized to permit the insertion of treats and when a pet or another animal has manipulated the treats to exit through the opening.

Figure 8B:
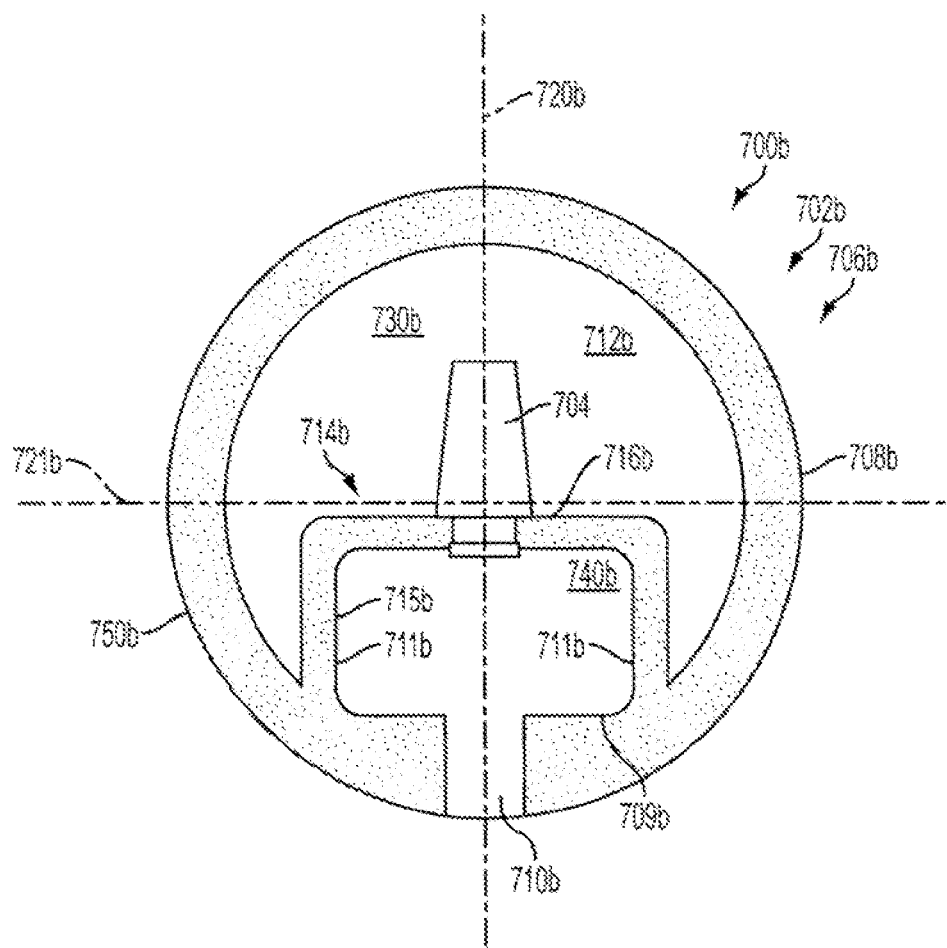

In accordance with one or more embodiments of the present invention, FIG. 8b is a cross-sectional schematic view of a noise producing toy structure. A noise producing toy structure 700b includes a toy 702b and squeaker 704. The toy comprises a substantially hollow body 706b having any suitable shape that includes the present noise producing toy structure.

An outer wall 708b of the body comprises a thick-wall construction and defines an inner space 712b. The outer wall includes at least one opening 710b for passage of the fluid. The opening may comprise a thickened peripheral portion for reinforcement and may have any suitable dimension. However, the size of the opening is preferably limited so that fluid movement is slowed to prolong the noise production of the squeaker.

An inner wall structure 714b comprises a thin-wall construction, i.e., is thinner than the outer wall, and divides the inner space into a sealed cavity 730b and dampening chamber 740b, wherein the sealed cavity is larger than the dampening chamber to increase the sound level of the noise. The inner wall structure is disposed in a portion proximal to the opening. The inner wall structure includes one or more side walls 715b and a transverse wall 716b. An outer wall portion 709b of the toy comprises a thickened wall and spans from one side wall to the other side wall.

Squeaker 704 is disposed in the transverse wall to project into cavity 730b and is mounted in any of the manners taught above. The squeaker places cavity 730b in fluid communication with chamber 740b. Preferably, a longitudinal axis 720b of the squeaker 704 connecting the proximal and distal ends of the squeaker also passes substantially through opening 710b.

With respect to the inner wall structure, the side walls are preferably angled with respect to a line tangent to the outer wall and protrude into the inner space. Preferably, the side walls are spaced apart from the outer wall at the intersection of the transverse wall and the side wall to limit deformation of chamber 740b. Preferably, the side walls are sized so that the cavity 730b is deformed when the outer wall 708b is deformed. Therein, side walls 715b are sized to locate the transverse wall and cavity in a lower portion for the body.

Thus, for example, if plane 721b denotes a longitudinal plane bisecting the body, the cavity and squeaker are located in the portion proximal to the opening to advantageously provide a large sealed cavity 730b to maximize sound volume. Furthermore, to maximize the volume of the sealed cavity, the side walls may be formed to comprise a cylinder and/or other enclosed structure preferably having an inner dimension 711b between the side walls and wherein the transverse wall provides a closed end.

To recess the squeaker from a user accessible portion 750b comprising the outer surface of outer wall 708b and to resist unintended removal of the squeaker from the toy, the flange of the squeaker may be located close to the bisecting plane 721b to minimize access to the squeaker.

When the toy is used, a deformation in the outer wall 708b except in portion 709b will decrease the fluid volume in cavity 730b. The fluid will be forced through the fluid passage of the squeaker into chamber 740b. In the process, the squeaker produces a noise.

As the body resiliently returns to its original shape, cavity 730b expands slowly as the opening 710b throttles the quantity of fluid returning into the cavity. The fluid movement through the squeaker causes a prolonged noise as fluid pressure equalizes between cavity 730b and chamber 740b.

In one or more embodiments, opening 710b is suitably sized to permit the insertion of treats and when a pet or another animal has manipulated the treats to exit through the opening.

Figure 8C:
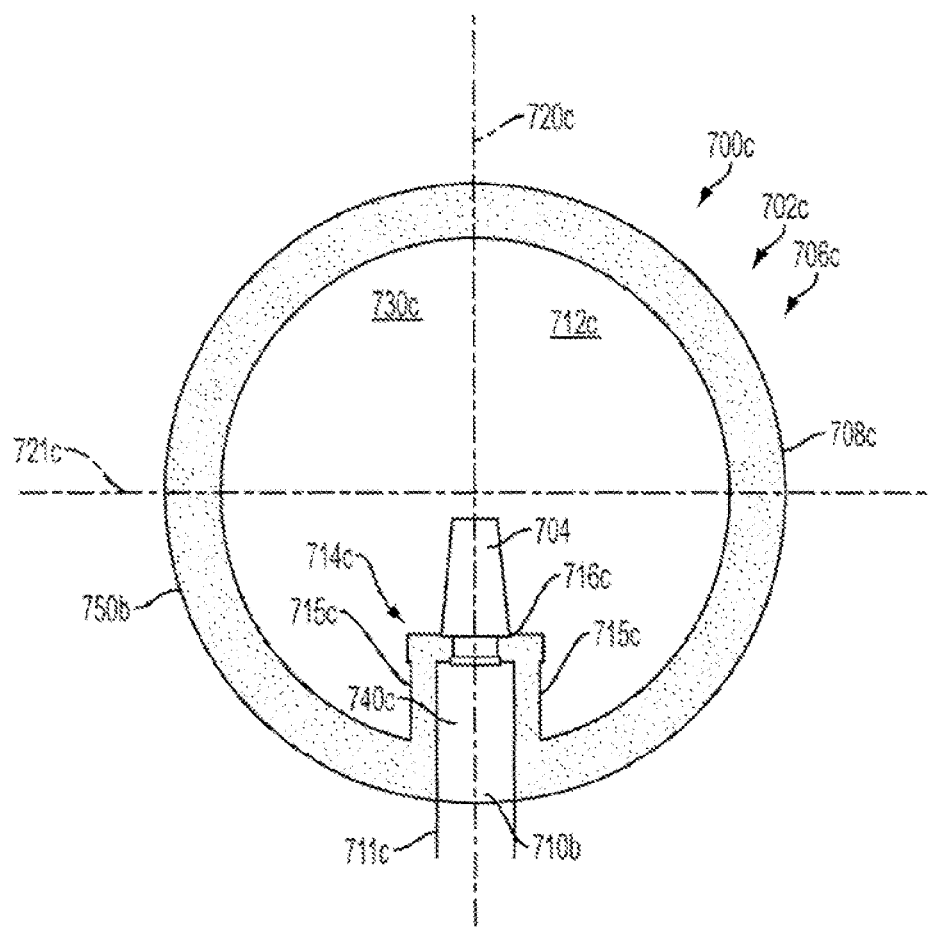

In accordance with one or more embodiments of the present invention, FIG. 8c is a cross-sectional schematic view of a noise producing toy structure. A noise producing toy structure 700c includes a toy 702c and squeaker 704. The toy comprises a substantially hollow body 706c having any suitable shape that includes the present noise producing toy structure.

An outer wall 708c of the body comprises a thick-wall construction and defines an inner space 712c. The outer wall includes at least one opening 710c for passage of the fluid, as further described below. The opening may comprise a thickened peripheral portion for reinforcement and may have any suitable dimension. However, the size of the opening is preferably limited so that fluid movement is slowed to prolong the noise production of the squeaker.

An inner wall structure 714c comprises a thin-wall construction, i.e., is thinner than the outer wall, and divides the inner space into a sealed cavity 730c and dampening chamber 740c, wherein the sealed cavity is substantially larger than the dampening chamber to increase the sound level of the noise. The inner wall structure may comprise a pair of spaced-apart side walls 715c, which substantially define opening 710c in the outer wall for passage of ambient fluid. The inner wall structure further comprises a transverse wall 716c that connects the side walls.

Squeaker 704 is disposed in the transverse wall and projects into cavity 730c. The squeaker may be mounted in the transverse wall in any of the manners taught above. The squeaker places cavity 730c in fluid communication with chamber 740c. Preferably, a longitudinal axis 720c of the squeaker 704 connecting the proximal and distal ends of the squeaker also passes substantially through opening 710c.

With respect to the inner wall structure, the side walls are preferably angled with respect to a tangent line of the outer wall in a cross-sectional view. The side walls protrude into the inner space and may form a rectangular shape with the transverse wall in a cross-sectional view. Advantageously, side walls 715c are preferably sized to locate the transverse wall and cavity in a lower portion for the body.

Thus, for example, if plane 721c denotes a longitudinal plane bisecting the body, the cavity and squeaker are located in the portion proximal to the opening to advantageously provide a large sealed cavity 730c to maximize sound volume. Furthermore, to maximize the volume of the sealed cavity, the side walls may be formed to comprise a cylinder and/or other enclosed structure preferably having an inner dimension 711c substantially identical to the opening 710c and wherein the transverse wall provides a closed end.

To recess the squeaker from a user accessible portion 750c comprising the outer surface of outer wall 708b and to resist unintended removal of the squeaker from the toy, the flange of the squeaker may be located close to the bisecting plane 721c to minimize access to the squeaker.

When the toy is used, a deformation in the outer wall 708c except at the opening 710c will decrease the fluid volume in cavity 730c. The fluid will be forced through the fluid passage of the squeaker into chamber 740c. In the process, the squeaker produces a noise.

As the body resiliently returns to its original shape, cavity 730c expands as fluid returns to the cavity. The fluid movement through the squeaker causes a prolonged noise as fluid pressure equalizes between cavity 730c and chamber 740c.

Figure 8D:
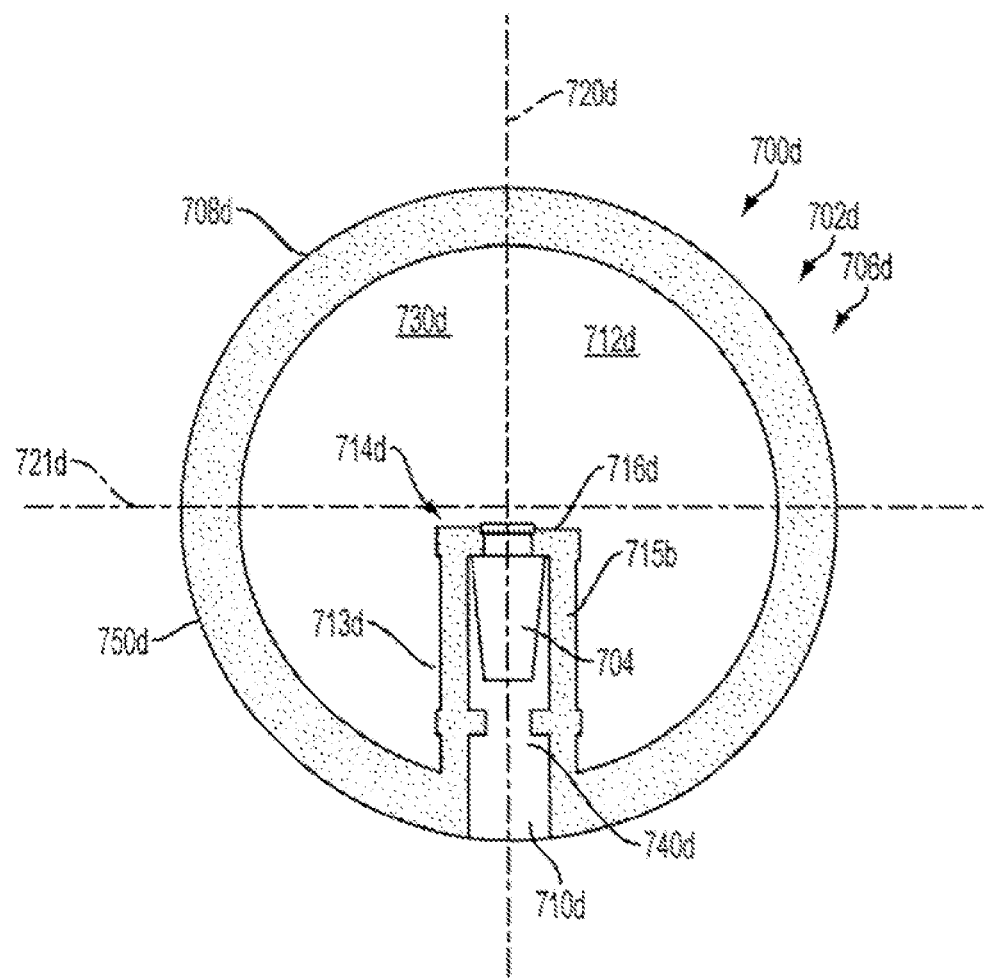

In accordance with one or more embodiments of the present invention, FIG. 8d is a cross-sectional schematic view of a noise producing toy structure. A noise producing toy structure 700d, which may be similar to noise producing toy structure 700d, includes a toy 702d and squeaker 704. The toy comprises a substantially hollow body 706d having any suitable shape that includes the present noise producing toy structure.

An outer wall 708d of the body comprises a thick-wall construction and defines an inner space 712d. The outer wall includes at least one opening 710d for passage of the fluid, as further described below. The opening may comprise a thickened peripheral portion for reinforcement and may have any suitable dimension. However, the size of the opening is preferably limited so that fluid movement is slowed to prolong the noise production of the squeaker.

An inner wall structure 714d comprises a thin-wall construction, i.e., is thinner than the outer wall, and divides the inner space into a sealed cavity 730d and dampening chamber 740d, wherein the sealed cavity is substantially larger than the dampening chamber to increase the sound level of the noise. The inner wall structure may comprise a pair of spaced-apart side walls 715d, which substantially define opening 710d in the outer wall for passage of ambient fluid. The inner wall structure further comprises a transverse wall 716d that connects the side walls.

Squeaker 704 is disposed in the transverse wall and projects into chamber 740d to maximize the volume of cavity 730d. The squeaker may be mounted in the transverse wall in any of the manners taught above. The squeaker places cavity 730d in fluid communication with chamber 740d. Preferably, a longitudinal axis 720d of the squeaker 704 connecting the proximal and distal ends of the squeaker also passes substantially through opening 710d.

With respect to the inner wall structure, the side walls are preferably angled with respect to a tangent line of the outer wall in a cross-sectional view. The side walls protrude into the inner space and may form a rectangular shape with the transverse wall in a cross-sectional view. Advantageously, side walls 715d are preferably sized to locate the transverse wall and cavity in a lower portion for the body.

Thus, for example, if plane 721d denotes a longitudinal plane bisecting the body, the cavity and squeaker are located in the portion proximal to the opening to advantageously provide a large sealed cavity 730d to maximize sound volume. Furthermore, to maximize the volume of the sealed cavity, the side walls may be formed to comprise a cylinder and/or other enclosed structure preferably having an inner dimension 711d substantially identical to the opening 710d and wherein the transverse wall provides a closed end.

To recess the squeaker from a user accessible portion 750d comprising the outer surface of outer wall 708d and to resist unintended removal of the squeaker from the toy, the flange of the squeaker may be located close to the bisecting plane 721d to minimize access to the squeaker. Additionally, Stub walls 713d that project into chamber 740d may be provided and further resist unintended access to the squeaker.

When the toy is used, a deformation in the outer wall 708d except at the opening 710d will decrease the fluid volume in cavity 730d. The fluid will be forced through the fluid passage of the squeaker into chamber 740d. In the process, the squeaker produces a noise.

As the body resiliently returns to its original shape, cavity 730d expands as fluid returns to the cavity. The fluid movement through the squeaker causes a prolonged noise as fluid pressure equalizes between cavity 730d and chamber 740d.

Figure 8E:
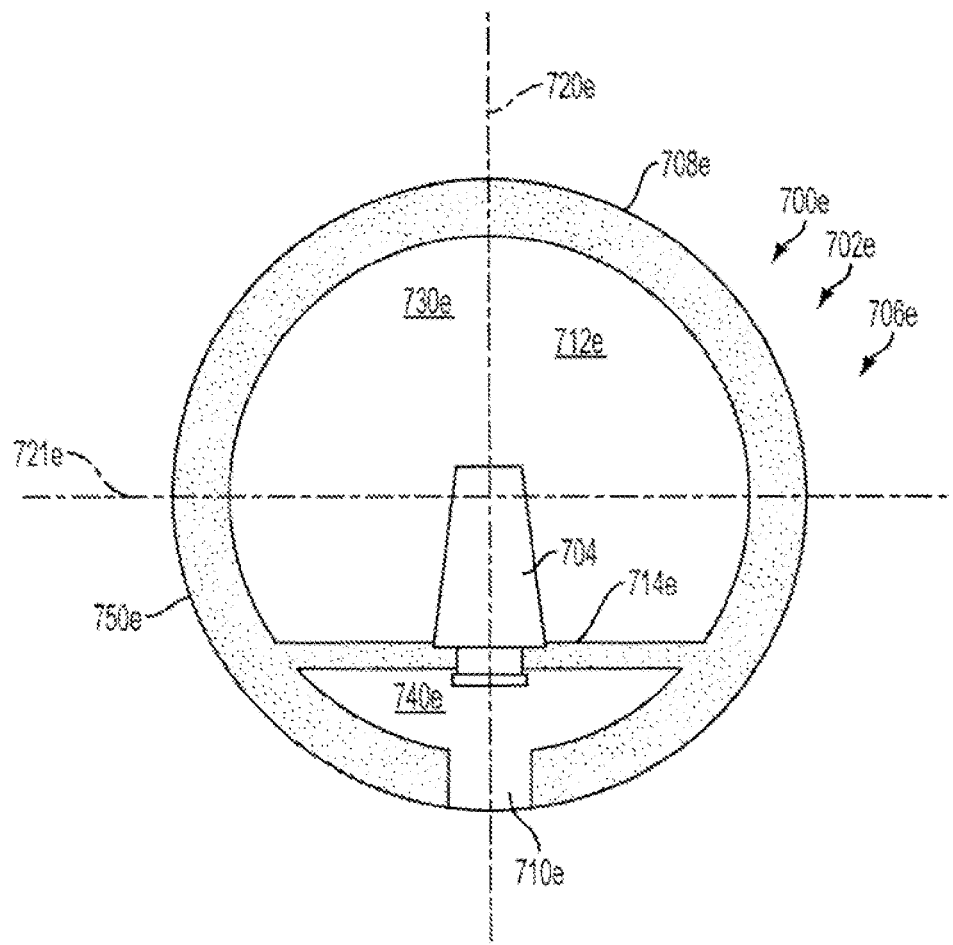

In accordance with one or more embodiments of the present invention, FIG. 8e is a cross-sectional schematic view of a noise producing toy structure. A noise producing toy structure 700e includes a toy 702e and squeaker 704. The toy comprises a substantially hollow body 706e having any suitable shape that includes the present noise producing toy structure.

An outer wall 708e of the body comprises a thick-wall construction and defines an inner space 712e. The outer wall includes at least one opening 710e for passage of the fluid. The opening may comprise a thickened peripheral portion for reinforcement and may have any suitable dimension. However, the size of the opening is preferably limited so that fluid movement is slowed to prolong the noise production of the squeaker.

An inner wall structure 714e comprises a thin-wall construction, i.e., is thinner than the outer wall, and preferably is formed as a planar inner wall, which comprises a first end and a second end that are joined to an inner surface of the outer wall. The inner wall structure divides the inner space into a sealed cavity 730e and dampening chamber 740e, wherein the sealed cavity is substantially larger than the dampening chamber to increase the sound level of the noise.

Squeaker 704 is disposed in the inner wall and projects into cavity 730e. The squeaker may be mounted in any of the manners taught above. The squeaker places cavity 730e in fluid communication with chamber 740e. Preferably, a longitudinal axis 720e of the squeaker 704 connecting the proximal and distal ends of the squeaker also passes substantially through opening 710e.

Advantageously, the inner wall is located in a lower portion for the body. Thus, for example, if plane 721e denotes a longitudinal plane bisecting the body, the cavity and squeaker are located in the portion proximal to the opening to advantageously provide a large sealed cavity 730e to maximize sound volume yet recessed to hinder access to the squeaker.

The squeaker is recessed from a user accessible portion 750e comprising the outer surface of outer wall 708e by spacing the inner wall a sufficient distance from opening 710e. In accordance with one embodiment of the present invention, the flange of the squeaker may be located close to the bisecting plane 721e to minimize access to the squeaker.

When the toy is used, a deformation in the outer wall 708e proximal to cavity 730e will decrease the fluid volume in the cavity. The fluid will be forced through the fluid passage of the squeaker into chamber 740e. In the process, the squeaker produces a noise.

As the body resiliently returns to its original shape, cavity 730e expands as fluid returns to the cavity. The fluid movement through the squeaker causes a noise as fluid pressure equalizes between cavity 730e and chamber 740e.

Figure 8F:
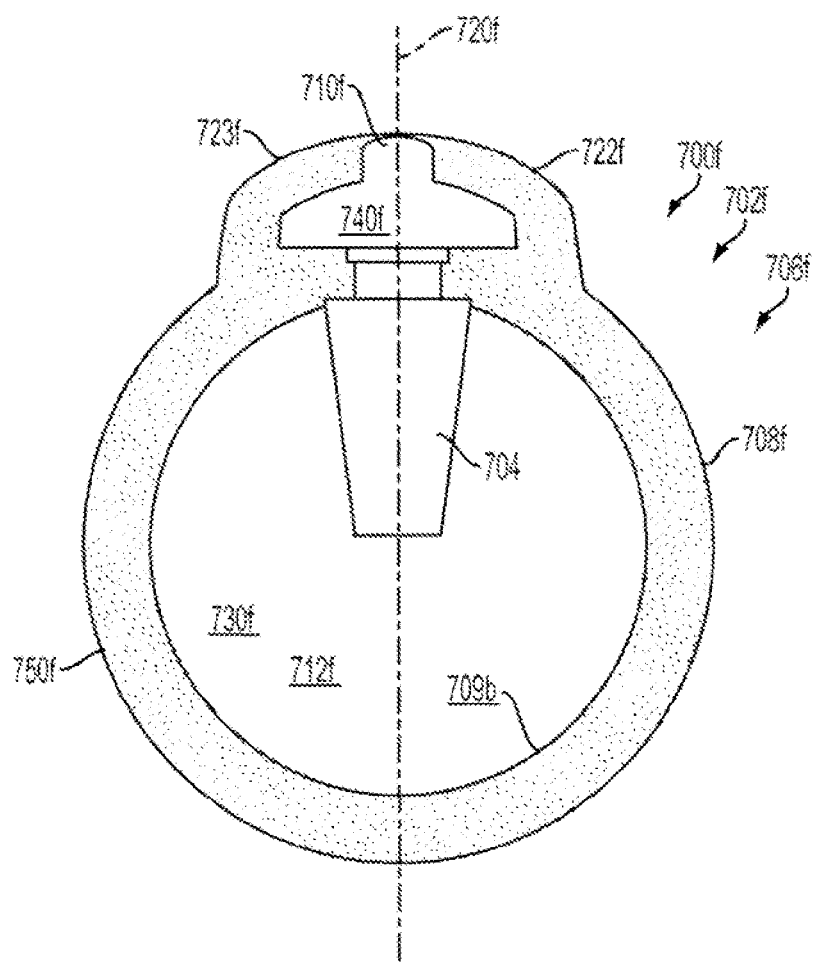

In accordance with one or more embodiments of the present invention, FIG. 8f is a cross-sectional schematic view of a noise producing toy structure. A noise producing toy structure 700f includes a toy 702f and squeaker 704. The toy comprises a substantially hollow body 706f having any suitable shape that includes the present noise producing toy structure.

An outer wall 708f of the body comprises a thick-wall construction and defines an inner space 712f which is substantially identical to a cavity 730f. Squeaker 704 is disposed in the outer wall in any manner taught above.

A crown 722f is provided proximal to the squeaker for recessing the squeaker from a user accessible portion 750f, which comprises the outer surface of outer wall 708f and the outer surface of the crown. The crown comprises one or more walls 723f having a thick-wall construction that form a chamber 740f.

An opening 710f is provided in walls 723f to permit passage of ambient fluid into the chamber. The chamber is in fluid communication with cavity 730f via the squeaker. The opening may be reinforced at a peripheral portion and may be sized to limit the volume of fluid that is able to move through the opening to prolong the sound of the squeaker. Preferably, a longitudinal axis 720f of the squeaker 704 connecting the proximal and distal ends of the squeaker also passes substantially through opening 710f. However, it should be appreciated that the opening may be offset and that indeed the crown may be off-set.

When the toy is used, a deformation in the outer wall 708f will decrease the fluid volume in cavity 730f. The fluid will be forced through the fluid passage of the squeaker into chamber 740f. In the process, the squeaker produces a noise.

As the body resiliently returns to its original shape, cavity 730f expands slowly as the opening 710f throttles the quantity of fluid returning into the cavity. The fluid movement through the squeaker causes a prolonged noise as fluid pressure equalizes between cavity 730f and chamber 740f.

In one or more embodiments, opening 710f is suitably sized to permit the insertion of treats into chamber 740f and when a pet or another animal has manipulated the treats to exit through the opening.

Figure 8G:
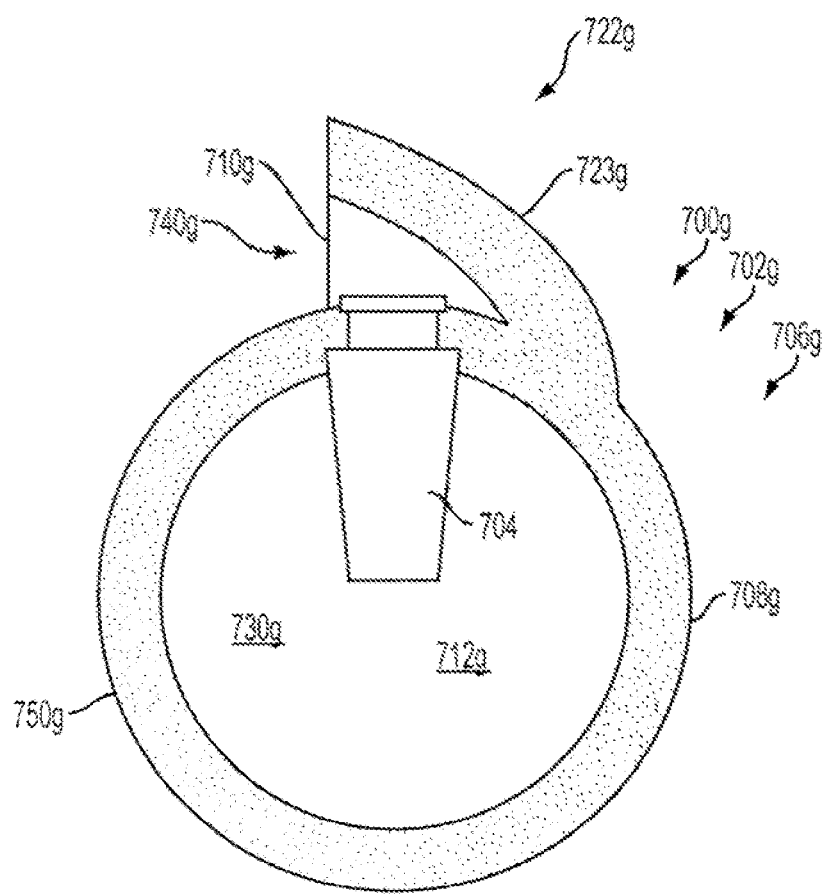

In accordance with one or more embodiments of the present invention, FIG. 8g is a cross-sectional schematic view of a noise producing toy structure. A noise producing toy structure 700g includes a toy 702g and squeaker 704. The toy comprises a substantially hollow body 706g having any suitable shape that includes the present noise producing toy structure.

An outer wall 708g of the body comprises a thick-wall construction and defines an inner space 712g which is substantially identical to a cavity 730g. Squeaker 704 is disposed in the outer wall in any manner taught above.

A crown 722g is provided proximal to the squeaker for recessing the squeaker from a user accessible portion 750g, which comprises the outer surface of outer wall 708g and the outer surface of the crown. The crown comprises one or more angled walls 723g having a thick-wall construction that form a chamber 740g open to a side away from the angled wall to form an access 710g that permits passage of ambient fluid into the chamber.

The chamber is in fluid communication with cavity 730g via the squeaker. Wall 723g may be reinforced at a peripheral portion of access 710g. Access 710g may be sized to limit the volume of fluid that is able to move through the opening to prolong the sound of the squeaker.

When the toy is used, a deformation in the outer wall 708g will decrease the fluid volume in cavity 730g. The fluid will be forced through the fluid passage of the squeaker into chamber 740g. In the process, the squeaker produces a noise.

As the body resiliently returns to its original shape, cavity 730g expand as fluid returns into the cavity. The fluid may be slowed by a limitation in the size of access 710g that throttles the quantity of fluid returning into the cavity. The fluid movement through the squeaker causes a prolonged noise as fluid pressure equalizes between cavity 730g and chamber 740g.

In one or more embodiments, opening 710g is suitably sized to permit the insertion of treats into chamber 740g and when a pet or another animal has manipulated the treats to exit through the opening.

Figure 8H:
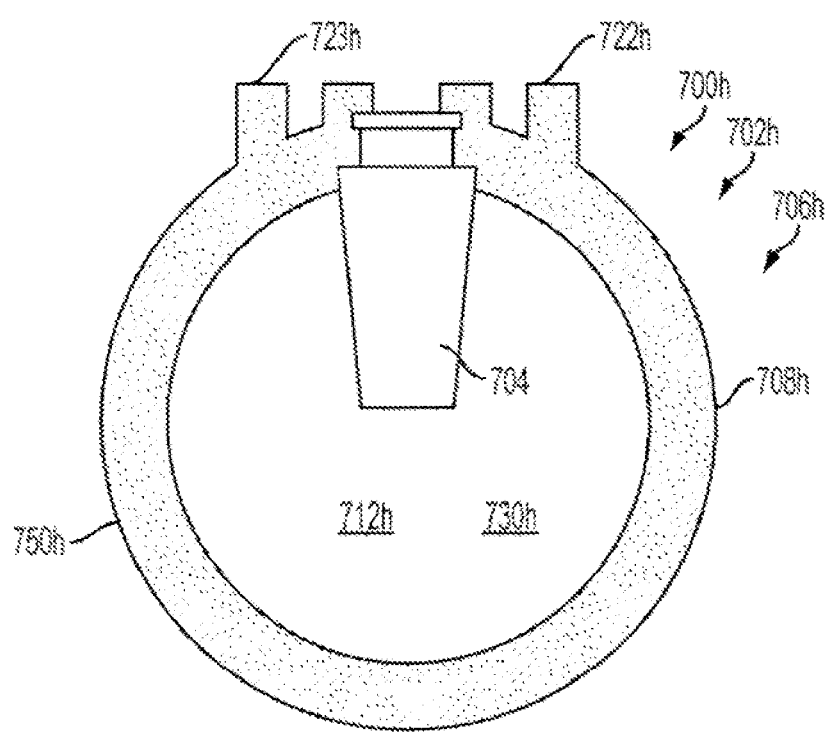
FIGS. 8h and 8i are cross-sectional schematic views of respective noise producing toy structures in accordance with one or more embodiments of the present invention.
Figure 8I:
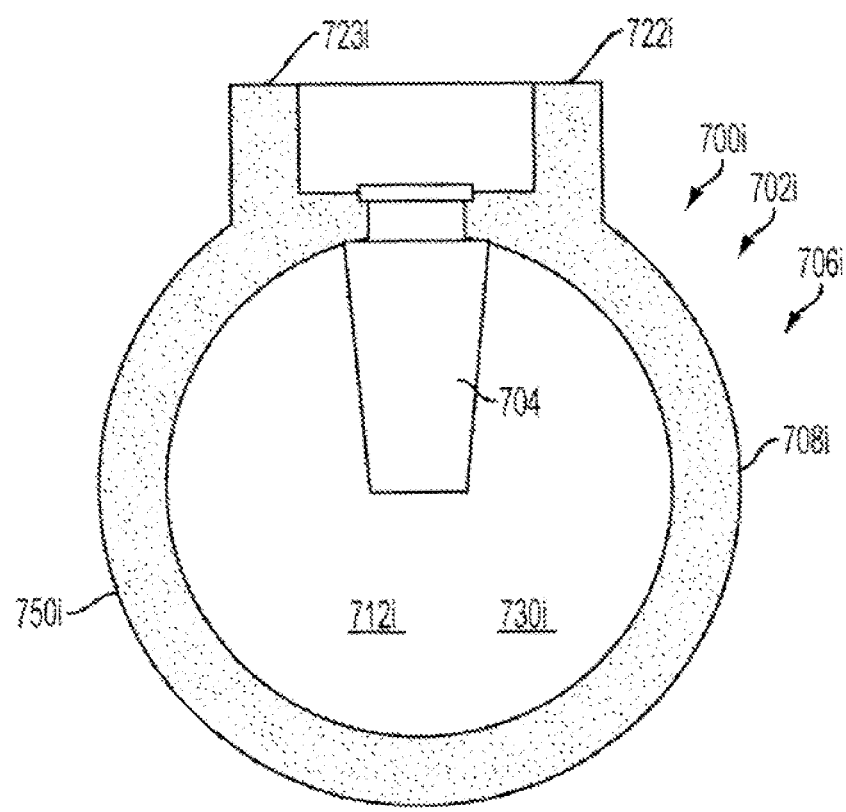

FIGS. 8h and 8i are cross-sectional schematic views of respective noise producing toy structures in accordance with one or more embodiments of the present invention. Although the figures illustrate a body having a substantially circular outer wall in cross-section, the present invention is not limited to a toy or toy structure that is circular in cross-section. The cross-sectional shapes herein are illustrative only, and, thus, square, octagonal, irregular, rectangular, and/or any other shape that may be suitable are contemplated for use.

The body comprises natural rubber and/or like elastic and/or resilient material and preferably when thrown provides a bounce to enhance the use of the toy or when used is resiliently elastic to permit the partial or complete evacuation of fluid media from one or more cavities or spaces. As used herein "used" refers to the toy being thrown, squeezed, impacted, manipulated or otherwise temporarily deformed sufficient to permit the partial or complete evacuation of fluid media, such as air, from one or more cavities or spaces.

The cavities described herein need not extend along the entire length of the body but may be formed with end walls and thus comprise structures upright from another wall.

A noise producing toy structure 700h-700i for a toy for a pet or human comprises a respective toy 702h-702i and a noise producing assembly or noise producing element 704, hereinafter referred to as a squeaker 704 for simplicity. Squeaker 704 may be any of the squeakers taught previously and especially noise producing assembly 600 having a shroud 602 that completely encases a squeaker mechanism, and which is mounted in the toy.

Respective toy 702h-702i includes a respective body 706h-706i comprising one or more walls upright from the outer wall and that are disposed proximal to a noise producing element. A free end of the wall or walls spaces a user from the squeaker and hinders access to the squeaker.

In accordance with one or more embodiments of the present invention, FIG. 8h is a cross-sectional schematic view of a noise producing toy structure. A noise producing toy structure 700h includes a toy 702h and squeaker 704. The toy comprises a substantially hollow body 706h having any suitable shape that includes the present noise producing toy structure.

An outer wall 708h of the body comprises a thick-wall construction and defines an inner space 712h which is substantially identical to a sealed cavity 730h. Squeaker 704 is disposed in the outer wall in any manner taught above.

A crown 722h is provided proximal to the squeaker for recessing the squeaker from a user accessible portion 750h, which comprises at least the outer surface of outer wall 708h. The crown comprises one or more spaced-apart walls 723h having a thick-wall construction. A space 740h between the walls permits passage of ambient fluid into the cavity via the squeaker.

Walls 723h may be suitable spaced to prevent an animal from gaining access to the squeaker.

When the toy is used, a deformation in the outer wall 708h will decrease the fluid volume in cavity 730h. The fluid will be forced through the fluid passage of the squeaker into the environment. In the process, the squeaker produces a noise.

As the body resiliently returns to its original shape, cavity 730h expand as fluid returns into the cavity. The fluid movement through the squeaker causes noise as fluid pressure equalizes between cavity 730h and the environment.

In accordance with one or more embodiments of the present invention, FIG. 8i is a cross-sectional schematic view of a noise producing toy structure. A noise producing toy structure 700i includes a toy 702i and squeaker 704. The toy comprises a substantially hollow body 706i having any suitable shape that includes the present noise producing toy structure.

An outer wall 708i of the body comprises a thick-wall construction and defines an inner space 712i which is substantially identical to a sealed cavity 730i. Squeaker 704 is disposed in the outer wall in any manner taught above.

A crown 722i is provided proximal to the squeaker for recessing the squeaker from a user accessible portion 750i, which comprises at least the outer surface of outer wall 708i. The crown comprises a plurality spaced-apart walls 723i having a thick-wall construction. A space 740i between the walls permits passage of ambient fluid into the cavity via the squeaker.

Walls 723i may be suitable spaced and numerous to prevent an animal from gaining access to the squeaker.

When the toy is used, a deformation in the outer wall 708i will decrease the fluid volume in cavity 730i. The fluid will be forced through the fluid passage of the squeaker into the environment. In the process, the squeaker produces a noise.

As the body resiliently returns to its original shape, cavity 730i expand as fluid returns into the cavity. The fluid movement through the squeaker causes noise as fluid pressure equalizes between cavity 730i and the environment.

Figure 9:
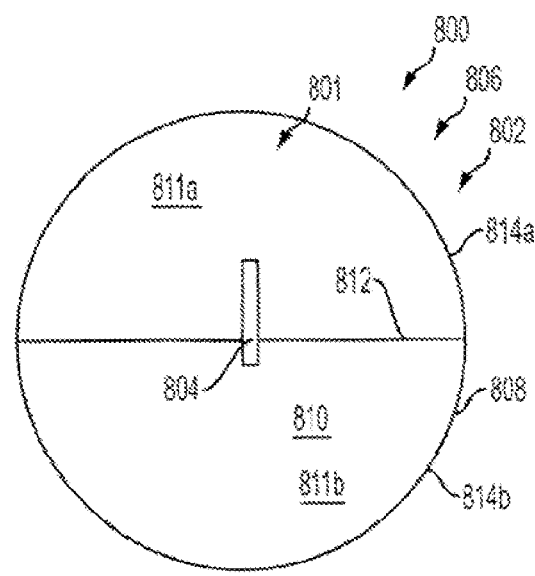
FIG. 9 is a cross-sectional schematic view of a noise producing toy structure in accordance with one or more embodiments of the present invention.

FIG. 9 is a cross-sectional schematic view of a noise producing toy structure in accordance with one or more embodiments of the present invention. Although the figure illustrates a body having a substantially circular outer wall in cross-section, the present invention is not limited to a toy or toy structure that is circular in cross-section. The cross-sectional shape herein is illustrative only, and, thus, square, octagonal, irregular, rectangular, and/or any other shape that may be suitable are contemplated for use.

The body comprises natural rubber, synthetic rubber, thermoplastic elastomers, vinyl, and/or like elastic and/or resilient material and preferably when thrown provides a bounce to enhance the use of the toy or when used is resiliently elastic to permit the partial or complete evacuation of fluid media from one or more cavities or spaces. As used herein "used" refers to the toy being thrown, squeezed, impacted, manipulated or otherwise temporarily deformed sufficient to permit the partial or complete evacuation of fluid media, such as air, from one or more cavities or spaces.

The cavities described herein need not extend along the entire length of the body but may be formed with end walls and thus comprise structures upright from another wall.

As taught herein, the mounting of a squeaker is different in vinyl or in natural rubber or synthetic rubber. Herein, natural or synthetic rubber is preferred as a body for the toy.

A noise producing toy structure 800 includes a toy 802 and a squeaker 804. Squeaker 804 may be any squeaker as taught above. The toy comprises a substantially hollow body 806 having any suitable shape that includes the present noise producing toy structure.

An outer wall 808 of the body comprises a thick-wall construction and defines a sealed inner space 810. The body comprises an inner wall 812 that divides the sealed inner space into a first sealed cavity 811a and a second cavity 811b each having a predetermined quantity of a fluid medium, such as air, that is generally indicated as 801.

Squeaker 804 is disposed inner wall 812 and may be mounted as taught above. The squeaker places cavities 811a and 811b in fluid communication.

When used, an outer portion 814a of outer wall 808 that is proximal to cavity 811a or an outer portion 814b of outer wall 808 that is proximal to cavity 811b may impact creating pressure in the cavity and causing the fluid to move through the squeaker to the other cavity and creating noise.

Since the squeaker is disposed inside the body, access requires creating an opening in the body and removing the squeaker from the inner wall. Thus, the noise producing toy structure 800 is extremely secure in preventing unintended access to the squeaker.

In accordance with one or more embodiments of the present invention, inner wall 812 comprises one or more openings and, thus, cavities 811a and 811b are not sealed and are in constant fluid communication.

Therein, when used, an outer portion 814a of outer wall 808 that is proximal to cavity 811a or an outer portion 814b of outer wall 808 that is proximal to cavity 811b may impact creating pressure in the cavity and causing the fluid to move at least through the squeaker to the other cavity and creating noise.

Figure 10:
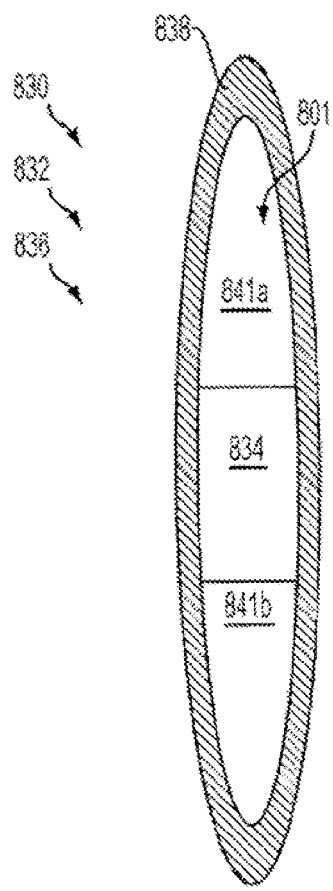
FIG. 10 is a cross-sectional schematic view of a noise producing toy structure in accordance with one or more embodiments of the present invention.

FIG. 10 is a cross-sectional schematic view of a noise producing toy structure in accordance with one or more embodiments of the present invention. Although the figure illustrates a body having a substantially circular outer wall in cross-section, the present invention is not limited to a toy or toy structure that is circular in cross-section. The cross-sectional shape herein is illustrative only, and, thus, square, octagonal, irregular, rectangular, and/or any other shape that may be suitable are contemplated for use.

The body comprises natural rubber, synthetic rubber, thermoplastic elastomers, vinyl, and/or like elastic and/or resilient material and preferably when thrown provides a bounce to enhance the use of the toy or when used is resiliently elastic to permit the partial or complete evacuation of fluid media from one or more cavities or spaces. As used herein "used" refers to the toy being thrown, squeezed, impacted, manipulated or otherwise temporarily deformed sufficient to permit the partial or complete evacuation of fluid media, such as air, from one or more cavities or spaces.

The cavities described herein need not extend along the entire length of the body but may be formed with end walls and thus comprise structures upright from another wall.

As taught herein, the mounting of a squeaker is different in vinyl or in natural rubber or synthetic rubber. Herein, natural or synthetic rubber is preferred as a body for the toy.

A noise producing toy structure 830 includes a toy 832 and a squeaker 834. Squeaker 834 may be any squeaker as taught above. The toy comprises a substantially hollow narrow body 836 having any suitable shape that includes the present noise producing toy structure.

An outer wall 838 of the body comprises a thick-wall construction and defines a sealed inner space 840.

Squeaker 834 is disposed between two opposed portions of outer wall 838 and is mounted between the wall in any suitable manner taught above to divide the sealed inner space into a first sealed cavity 841a and a second cavity 841b each having a predetermined quantity of a fluid medium, such as air, that is generally indicated as 801. The squeaker places cavities 841a and 841b in fluid communication.

When used, an outer portion 844a of outer wall 838 that is proximal to cavity 841a or an outer portion 814b of outer wall 838 that is proximal to cavity 841b may impact creating pressure in the cavity and causing the fluid to move through the squeaker to the other cavity and creating noise.

Since the squeaker is disposed inside the body, access requires creating an opening in the body and removing the squeaker from the inner wall. Thus, the noise producing toy structure 830 is extremely secure in preventing unintended access to the squeaker.

A system and method has been shown in the above embodiments for the effective implementation of mounting arrangement for squeakers. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques.

What is claimed is:

1. A noise producing toy structure comprising:
    a toy comprising an outer wall and a crown raised from the outer wall, the outer wall defining an inner space and the crown defining a chamber;
    an opening for passing ambient fluid into the chamber;
    a noise producing element placing the inner space in fluid communication with chamber;
    wherein the crown hinders access to the noise producing element to resist unintended removal of the noise producing element.

2. The noise producing toy structure of claim 1, wherein the crown comprises an angled wall.

3. The noise producing toy structure of claim 1, wherein the crown comprises one wall and the opening comprises an access between the outer wall and an inside of the wall of the crown.

4. The noise producing toy structure of claim 1, wherein the crown comprises in cross-section a pair of spaced-apart walls.

5. The noise producing toy structure of claim 1, wherein the opening is disposed at an axis collinear with a longitudinal axis of the noise producing element.

6. The noise producing toy structure of claim 1, further comprising a bonding agent for securing the noise producing element to the toy.

7. The noise producing toy structure of claim 6, wherein the bonding agent comprises cyanocrylate or methyl ethyl ketone.

8. The noise producing toy structure of claim 1, wherein noise producing element protrudes into the inner space.

9. The noise producing toy structure of claim 1, wherein the chamber is asymmetric about an axis that is collinear with a longitudinal axis of the noise producing element.

10. A noise producing toy structure comprising:
    a toy comprising an outer wall, the outer wall defining an inner space;
    a noise producing element disposed in the outer wall for placing the inner space in fluid communication with an environment;
    a wall upright from the outer wall at a position proximal to the noise producing element, the wall having a free end to space a user from the noise producing element to hinder access to the noise producing element.

11. The noise producing toy structure of claim 10, further comprising a second wall upright from the outer wall at a position proximal to noise producing element, the second wall having a free end to space a user from the noise producing element to hinder access to the noise producing element.

12. The noise producing toy structure of claim 10, wherein the noise producing element protrudes into the inner space.

13. The noise producing toy structure of claim 10, wherein the opening is disposed at an axis collinear with a longitudinal axis of the noise producing element.

14. The noise producing toy structure of claim 10, wherein the opening is disposed at an axis that is not collinear with a longitudinal axis of the noise producing element.

15. A noise producing toy structure comprising:
    a toy having an outer wall, a crown, and an inner space;
    a noise producing element disposed in the outer wall for placing the inner space in fluid communication with an environment;
    wherein the crown hinders access to the noise producing element to resist unintended removal of the noise producing element.

16. The noise producing toy structure of claim 15, further comprising an opening in the crown throttling the fluid communication.

17. The noise producing toy structure of claim 15, wherein the crown comprises two walls.

18. The noise producing toy structure of claim 15, wherein the chamber is symmetric about an axis that is collinear with a longitudinal axis of the noise producing element.

19. The noise producing toy structure of claim 18, wherein the inner space is symmetric about the axis that is collinear with the longitudinal axis of the noise producing element.

20. The noise producing toy structure of claim 15, wherein the chamber is asymmetric about an axis that is collinear with a longitudinal axis of the noise producing element.

21. The noise producing toy structure of claim 20, wherein the inner space is symmetric about the axis that is collinear with the longitudinal axis of the noise producing element.

* * * * *

UNITED STATES PATENT AND TRADEMARK OFFICE
CERTIFICATE OF CORRECTION

PATENT NO. : 8,523,628 B2
APPLICATION NO. : 13/539860
DATED : September 3, 2013
INVENTOR(S) : Ryan Rutherford et al.

It is certified that error appears in the above-identified patent and that said Letters Patent is hereby corrected as shown below:

Title Page, item (56),

Front page, second column, OTHER PUBLICATIONS, line 1, "U.S. Appl. No. 7,736,212" should read --U.S. Patent No. 7,736,212--.
Page 2, second column, OTHER PUBLICATIONS, line 1, "U.S. Appl. No. 7,736,213" should read --U.S. Patent No. 7,736,213--.
Page 2, second column, OTHER PUBLICATIONS, line 2, "U.S. Appl. No. 7,833,079" should read --U.S. Patent No. 7,833,079--.

In the Specification

Column 3, line 21, "view" should read --views--.
Column 4, line 53, "may" should read --may be--.
Column 5, line 60, "additionally safety" should read --additional safety--.
Column 10, line 47, "Stub" should read --stub--.
Column 12, line 32, "form" should read --forms--.
Column 12, line 46, "expand" should read --expands--.
Column 13, line 47, "expand" should read --expands--.
Column 13, line 64, "plurality spaced-apart" should read --plurality of spaced-apart--.
Column 14, line 8, "expand" should read --expands--.

Signed and Sealed this
Twenty-first Day of April, 2015

Michelle K. Lee
*Director of the United States Patent and Trademark Office*